(12) United States Patent
Emad et al.

(10) Patent No.: US 7,504,151 B2
(45) Date of Patent: Mar. 17, 2009

(54) THERMOPLASTICS PERMEATION, RESISTANT MULTI-LAYERS FOR AIR CONDITIONING HOSE APPLICATION USING NANOFILLERS TECHNOLOGY

(75) Inventors: Mehdi Emad, Collegeville, PA (US); Franck Bertoux, Wayne, PA (US)

(73) Assignee: Arkema Inc., Philadelphia, PA (US)

( * ) Notice: Subject to any disclaimer, the term of this patent is extended or adjusted under 35 U.S.C. 154(b) by 410 days.

(21) Appl. No.: 11/376,068

(22) Filed: Mar. 14, 2006

(65) Prior Publication Data
US 2007/0218294 A1 Sep. 20, 2007

(51) Int. Cl.
*B32B 5/00* (2006.01)

(52) U.S. Cl. .................. 428/323; 428/337; 428/220

(58) Field of Classification Search ................. 428/220, 428/323, 337, 421, 423.1, 473.5, 474.4, 475.8, 428/500
See application file for complete search history.

(56) References Cited

U.S. PATENT DOCUMENTS

| 4,098,943 | A | * | 7/1978 | Degginger et al. | ....... 428/300.7 |
| 4,182,393 | A | * | 1/1980 | Larson et al. | ............... 152/524 |
| 6,652,937 | B1 | * | 11/2003 | Guo et al. | .................. 428/35.7 |

* cited by examiner

*Primary Examiner*—Thao T. Tran
(74) *Attorney, Agent, or Firm*—Thomas F. Roland

(57) ABSTRACT

The present invention concerns multi-layer structures comprising at least a layer of a thermoplastic compound containing nanofillers and at least a layer of rubber. These structures can be converted to bottles, reservoirs, containers, pipes, hoses and vessels of all sorts. The structures of the invention are of interest for the cryogenic fluids used in air conditioning, such as for example HFAs and HFCs.

8 Claims, No Drawings

THERMOPLASTICS PERMEATION, RESISTANT MULTI-LAYERS FOR AIR CONDITIONING HOSE APPLICATION USING NANOFILLERS TECHNOLOGY

FIELD OF THE INVENTION

The present invention relates to permeation-resistant multi-layer thermoplastics for air conditioning hose applications having nanofiller technology. More precisely the invention concerns multi-layers comprising at least a layer of a thermoplastic compound containing nanofillers and at least a layer of rubber. These multi-layers are permeation resistant to 134A, and R22 fluoro-refrigerants and are an integral part of the construction of Air Conditioning (AC) hoses. The thermoplastic containing nanofillers is a barrier material which could be used in various constructions, for example; as a part of a barrier hose construction (the compound is made as a film and sandwiched between other layers), or as part of a veneer type hose (where the compound is formed as a film and is inside the layer of the tubing and is in contact with the refrigerant and compressor oils). The compound is a blend of thermoplastic resins such as, by way of example, Polyamide nylon 6/66 copolymer, Polyamide 11, Polyamide 12, and polyamide 6/12 with nanofillers (nano-composites) such as clay, metal, and carbon tubes. These compounds could be made using extrusion technology or produced in the reactor.

BACKGROUND OF THE INVENTION

Patent application US 2004068037 describes blends of polyamides and clays. In the process of the invention, a polyamide A1 and an organized clay B are mixed mainly by dispersive mixing, and after added with a polyamide A2, mixed mainly by distributive mixing in a corotating intermeshing twin-screw extruder so designed as to effect the dispersive mixing and the distributive mixing. The organized clay B is completely and finely dispersed and distributed throughout the resultant polyamide composite material. Shaped articles such as films and sheets made of the polyamide composite material exhibit excellent gas barrier properties and transparency with little malodor mainly attributable to the decomposed products of the organizing agent for preparing the organized clay B.

Patent U.S. Pat. No. 5,578,672 describes polymers containing intercalated layered materials. More particularly, the present invention is directed to intercalates having at least two layers of oligomer and/or polymer molecules sorbed on the internal surfaces of adjacent layers of the planar platelets of a layered material, such as a phyllosilicate, preferably a smectite clay. The resulting matrix polymer/platelet composite materials are useful wherever polymer/filler composite materials are used, for example, as external body parts for the automotive industry; heat-resistant polymeric automotive parts in contact with an engine block; tire cord for radial tires; food wrap having improved gas impermeability; electric components; food grade drink containers; and any other use where it is desired to alter one or more physical properties of a matrix polymer, such as elasticity and temperature characteristics, e.g., glass transition temperature and high temperature resistance.

Japanese patent application JP2000086822 describes a resin composite material for hose material, isolator, it has organic clay dispersed in at least single segments of the block copolymer type thermoplastic elastomer which consists of many segments.

Japanese patent application JP 11310643 describes the manufacture of thermoplastic polymer-clay composite materials with good gas-barrier properties.

Japanese patent application US 4835065 describes a polyamide resin compositions for films for wrapping food-comprise lamellar silicates uniformly dispersed in copolymerised polyamide resin.

Japanese patent application US 4835065 describes a polyamide resin compositions for films having gas barrier properties made by uniformly dispersing lamellar silicate into resin consisting of aromatic and aliphatic polyamide resins.

Japanese patent application JP 03262633 describes the production of polyamide film useful for good packaging comprises of drawing polyamide containing evenly dispersed sheet silicate and having low water content.

Japanese patent application JP 04178459 describes a resin composition for stretched polyamide film comprises polyamide resin, silicate salts, hindered phenol series compound and silane for titanate coupling agent.

Japanese patent application JP 04080259 describes a resin composition of stretched polyamide film consists of polyamide resin, lamellar silicate and silane and/or titanate coupling agent.

Japanese patent application JP 08073734 describes a resin composition of polyamide for film practice for wrapping film composition containing inorganic filler, and mixture of zin oxide and basic aliphatic acid salt of magnesium. The resin composition has a controlled phase structure of resin in the exfoliated surfaces of the fillers.

European patent application US 5102948 describes a polyamide composite material containing layered slicate uniformly dispersed in the polyamide.

German patent application US 6117932 describes a resin composite including organophilic clay and functionalized (co)polymer, useful for injection, extrusion, blown and compression molding and for films.

Patent application US 2004-0225066 describes polyamide and polyolefin blends with a polyamide matrix and containing nanofillers. These blends are thermoplastic and can be converted to bottles, reservoirs, containers, pipes and vessels of all sorts. It also relates to structures comprising at least one layer of these blends and at least one layer of another material. These structures can be converted to bottles, reservoirs, containers, pipes and vessels of all sorts. All these objects exhibit good barrier properties. For example, foods packaged in these packagings are protected from atmospheric oxygen and their degradation is avoided, whereas a polyethylene packaging allows some oxygen to pass through and the foods undergo degradation. The barrier properties can also be used in another sense. Thus, in the Sheet Moulding Compound (SMC) technology, a composition based on crosslinkable unsaturated polyester and on styrene is disposed between two films and it is necessary for the styrene to remain in the composition and not to diffuse through the films. It is also possible to mention the barrier to pentane which is useful in packaging containing expandable polystryrene beads. Indeed, these beads contain pentane and it is necessary that the beads do not lose their pentane before their conversion to expanded polystyrene. It is also possible to mention pipes in which the cryogenic fluids for air conditioning circulate, such as for example HFAs and HFCs. In an air conditioning device, loss of fluid should be reduced both for economic reasons (these fluids are expensive) and for environmental protection reasons (an excessive leakage could damage the ozone layer).

European patent application US 5248720 describes a material for molded article and film having liquid or gas barrier property. It is a mixture containing a polyamide resin or a resin mixture containing a polyamide resin and a layered silicate uniformly dispersed therein. The material for molding of said patent is applicable for various uses requiring liquid or gas barrier property. Examples of applicable uses may include, but are not limited to, a gasoline tank, alcohol tank, fuel tube, fuel strainer, brake oil tank, clutch oil tank, power steering oil tank, Freon tube for a cooler, Freon tank, canister, air cleaner, intake system parts, etc. In example 1 one hundred grams of montmorillonite were dispersed in 10 liters of water, then 51.2 g of 12-aminododecanoic acid and 24 ml of concentrated hydrochloric acid were added and the mixture was stirred for 5 minutes, followed by filtration. Then, the filtered product was thoroughly washed and vacuum dried. By this operation, a composite of 12-aminododecanoic acid ammonium ion and montmorillonite was prepared. Next, into a reaction vessel equipped with a stirrer, 10 kg of ε-caprolactam, 1 kg of water and 100 g of the above composite were charged, and the mixture was stirred so that the reaction system became internally uniform at 100° C. Further, the temperature was raised up to 260° C., and the mixture was stirred under pressurization of 15 kg/cm² for one hour. Then, the pressure was released, and while the water was evaporated from the reaction vessel, the reaction was carried out under normal pressure for 3 hours. After completion of the reaction, the reaction product was taken out in strands from the bottom nozzle of the reaction vessel and was water-cooled and subjected to cutting to obtain pellets comprising a polyamide resin (average molecular weight 15,000) and montmorillonite. The pellets were immersed in hot water to extract and remove unreacted monomer (about 10%), followed by drying in vacuum, to give a material for a molded article. The material for a molded article was extrusion molded under the following conditions to prepare a tube with an outer diameter of ½ inch and a thickness of 1 mm, then permeability to Freon R22 was measured. All other examples are similarly based on a first mixing of montmorillonite with 12-aminododecanoic acid then with caprolactam. An example describes a bottle having an outer layer of composition above (PA 6 and montmorillonite), a tie layer and a polyethylene inner layer. Barrier properties of said bottle to gasoline are measured.

The previous art has not described multi-layers comprising at least a layer of a thermoplastic compound containing nanofillers and at least a layer of rubber.

In the two main methods of producing AC hoses for automotive application (Barrier and Veneer) the emphasis has been placed on producing compounds with better permeation to refrigerant. This invention however, takes advantage of increasing the path (tortures path) a diffusing gas will take to go through the tubing wall. This invention utilizes, by way of example, the improved gas barrier of a polyamide 6,66 copolymer when activated nano-clay is added to this material as an AC hose where the refrigerant going through the tubing made from this material is 134a.

SUMMARY OF THE INVENTION

The present invention concerns multi-layer structures comprising at least a layer of a thermoplastic compound containing nanofillers and at least a layer of rubber.

These structures can be converted to bottles, reservoirs, containers, pipes, hoses and vessels of all sorts. In the present application the "barrier type hose construction" means a structure comprising a rubber outer layer, a thermoplastic compound containing nanofillers as intermediate layer and a rubber inner layer. In the present application the "veneer type hose construction" means a structure comprising a rubber outer layer and a thermoplastic compound containing nanofillers as inner layer. In the above structures the inner layer means the layer in contact with the stored or transported fluid. Of course the structures above may additionally contain other layers.

The structures of the invention are of interest for the cryogenic fluids for air conditioning, such as for example HFAs and HFCs. In a specific embodiment this invention takes advantage of montmorillonite clay which is positively charged. This charge causes a separation among the clay platelets and hence results in good dispersion (exfoliation) of the nanoclay. Positive charge on the nano-clay further attract functional groups having negative dipole moments including but not limited to amines, ethers, esters, alcohols, and carbonyls. Additives such as nano-clay which is well dispersed in a matrix create longer critical paths during diffusion of a gases such as refrigerant 134A and reduce the permeation amount for a specified length of time.

The invention also relates to the use of these structures for producing a barrier effect.

The invention concerns more particularly pipes and hoses, made of the composition of the invention.

DETAILED DESCRIPTION OF THE INVENTION

As regards the thermoplastic, mention may be made of polyamides, TPU, fluoropolymers (PVDF homo or copolymers), terpolymer of tetrafluoroethylene, hexafluoropropylene and vinylidene fluoride (THV), perfluoroalkoxy (PFA), polyimides, PPS, PPO. Polyamides are advantageously used.

The polyamide resin for use in the invention is meant to indicate polyamide to be prepared from starting materials of essentially an amino acid, a lactam or a diamine, and a dicarboxylic acid. Mention may be made of one or more salts or mixtures of diamines such as hexamethylenediamine, dodecamethylenediamine, meta-xylylenediamine, bis(p-aminocyclohexyl)methane and trimethylhexamethylenediamine with diacids such as isophthalic, terephthalic, adipic, azelaic, suberic, sebacic and dodecanedicarboxylic acid. Examples of alpha,omega-amino carboxylic acids that may be mentioned include aminoundecanoic acid and aminododecanoic acid. Examples of dicarboxylic acids that may be mentioned include adipic acid, sebacic acid, isophthalic acid, butanedioic acid, 1,4-cyclohexanedicarboxylic acid, terephthalic acid, the sodium or lithium salt of sulphoisophthalic acid, dimerized fatty acids (these dimerized fatty acids having a dimer content of at least 98% and preferably being hydrogenated) and dodecanedioic acid, $HOOC—(CH_2)_{10}—COOH$. The diamine can be an aliphatic diamine having 6 to 12 carbon atoms; it may be of aryl and/or saturated cyclic type. Examples that may be mentioned include hexamethylenediamine, piperazine, tetramethylenediamine, octa-methylenediamine, decamethylenediamine, dodecamethylenediamine, 1,5-diaminohexane, 2,2,4-trimethyl-1,6-diaminohexane, diamine polyols, isophoronediamine (IPD), methylpentamethylenediamine (MPDM), bis(aminocyclohexyl)methane (BACM) and bis(3-methyl-4-aminocyclohexyl)methane (BMACM).

It could be also a copolyamide to be prepared from at least an amino acid or a lactam, a diamine and a dicarboxylic acid.

Mention may be made of PA-11, PA-12, PA 6/6,6, PA 6/12 and PA 6.

Mention may also be made of those of formula X, Y/Z or 6, Y2/Z in which:

X denotes the residues of an aliphatic diamine having from 6 to 10 carbon atoms;

Y denotes the residues of an aliphatic dicarboxylic acid having from 10 to 14 carbon atoms;

Y2 denotes the residues of an aliphatic dicarboxylic acid having from 15 to 20 carbon atoms; and Z denotes at least one unit chosen from the residues of a lactam, the residues of an alpha, omega-aminocarboxylic acid, the unit X1,Y1 in which X1 denotes the residues of an aliphatic diamine and Y1 denotes the residues of an aliphatic dicarboxylic acid, the weight ratios Z/(X+Y+Z) and Z/(6+Y2+Z) being between 0 and 15%.

Mention may be made by way of example of PA-6, 10 (hexamethylenediamine and sebacic acid units), PA-6, 12 (hexamethylenediamine and dodecanedioic acid units), PA-6, 14 (hexamethylenediamine and C14 diacide), PA-6, 18 (hexamethylenediamine and C18 diacide) and PA-10, 10 (1, 10-decane diamine and sebacic acid units).

Mention may also be made of polyamides of formula X/Y, Ar in which:

Y denotes the residues of an aliphatic diamine having from 8 to 20 carbon atoms;

Ar denotes the residues of an aromatic dicarboxycylic acid;

X denotes either the residues of aminoundecanoic acid $NH_2—(CH_2)_{10}—COOH$, of lactam 12 or of the corresponding amino acid, or the unit Y,x remains from the condensation of the diamine with an aliphatic diacid (x) having between 8 and 20 carbon atoms or else the unit Y, 1 remains from the condensation of the diamine with isophthalic acid. X/ Y,Ar denotes, for example:

11/10,T, which results from the condensation of aminoundecanoic acid, 1,10-decanediamine and terephthalic acid;

12/12,T, which results from the condensation of lactam 12, 1,12-dodecanediamine and terephthalic acid;

10,10/10,T, which results from the condensation of sebacic acid, 1,10-decanediamine and terephthalic acid; and 10,I/10,T, which results from the condensation of isophthalic acid, 1,10-decanediamine and terephthalic acid.

The inherent viscosity of the polyamide of the outer layer (1) may be between 1 and 2 and advantageously between 1.2 and 1.8. The inherent viscosity is measured at 20° C. for a 0.5% concentration in metacresol. The polyamide of the outer layer (1) may contain from 0 to 30% by weight of at least one product chosen from plasticizers and impact modifiers per 100 to 70% of polyamide respectively. This polyamide may contain the usual additives, such as UV stabilizers, thermal stabilizers, antioxidants, fire retardants, etc.

As far as the nanofillers are concerned, they designate particles of any shape, at least one of their dimensions being in the nanometer range. Advantageously, they are lamellar peelable fillers. In particular, the lamellar peelable fillers are silicates and in particular organophilic treated clays; these clays, which exist in the form of sheets, are made organophilic by intercalating organic or polymeric molecules between them, and are obtained in particular according to a process as described in patent U.S. Pat. No. 5,578,672.

Preferably, the clays used are of the smectite type, either of natural origin, such as in particular montmorillonites, bentonites, saponites, hectorites, fluorohectorites, beidellites, stibensites, nontronites, stipulgites, attapulgites, illites, vermiculites, halloysites, stevensites, zeolites, fuller's earth and mica, or of synthetic origin, such as permutites.

By way of example, mention may be made of the organophilic clays described in patent U.S. Pat. No. 6,117,932. Preferably, the clay is modified with an organic substance by ionic bonding with an onium ion having 6 carbon atoms or more. If the number of carbon atoms is less than 6, the organic onium ion is too hydrophilic and therefore the compatibility with the polymer ((A) and (B) blend) may decrease. By way of example of organic onium ion, mention may be made of hexylammonium ions, octylammonium ions, 2-ethylhexylammonium ions, dodecylammonium ions, laurylammonium ions, octadecylammonium (stearylammonium) ions, dioctyldimethylammonium ions, trioctylammonium ions, distearyldimethylammonium ions, stearyltrimethylammonium ions and ammonium laurate ions. It is recommended to use a clay having the highest possible surface of contact with the polymer. The higher the contact surface, the greater the separation of the clay lamellae. The cationic exchange capacity of the clay is preferably between 50 and 200 milliequivalents per 100 g. If the capacity is less than 50, the exchange of the onium ions is insufficient and the separation of the clay lamellae may be difficult. By contrast, if the capacity is greater than 200, the strength of bonding between the clay lamellae is so strong that the separation of the lamellae may be difficult. By way of example of clay, mention may be made of smectite, montmorillonite, saponite, hectorite, beidellite, stibensite, nontronite, vermiculite, halloysite and mica. These clays may be of natural or synthetic origin. The proportion of organic onium ion is advantageously between 0.3 et 3 equivalents of the ion exchange capacity of the clay. If the proportion is less than 0.3, the separation of the clay lamellae may be difficult. If the proportion is greater than 3, degradation of the polymer may occur. The proportion of organic onium ion is preferably between 0.5 and 2 equivalents of the ion exchange capacity of the clay.

The nanofiller may also advantageously include carbon nanotubes.

As far as the proportion of nanofillers in the thermoplastic is concerned, it may be at any level. The higher this proportion, the better the barrier properties. Advantageously, this proportion is between 0.1 and 50 parts per respectively 100 parts of the thermoplastic; and preferably between 0.5 and 15 and more preferably between 2 and 15. There will be no departure from the framework of the invention on using a blend of nanofillers.

The thermoplastic compound containing nanofillers may additionally contain at least one additive chosen from:

colorants;
pigments;
brightners;
antioxidants;
flame retardants;
UV stabilizers.

The compositions of the invention are prepared either by blending all the ingredients (thermoplastic, nanofillers and optional additive) in the so-called "direct" process, or by adding the nanofillers and the optional additive to the thermoplastic. The thermoplastic containing nanofillers may be obtained during the polymerization of its monomer (or its monomers) in the presence of nanofillers.

Use is advantageously made of the usual blending and kneading devices in the thermoplastics industry such as extruders and kneaders, for example BUSS® cokneaders.

As regards the layers of rubber it is more precisely a vulcanized elastomer, the vulcanizable synthetic or natural elastomers which are suitable for carrying out the present invention are well known to those skilled in the art, in the definition of the present invention the term "elastomer" meaning that it may consist of blends of several elastomers.

These elastomers or blends of elastomers have a compression set (CS) at 100° C. of less than 50%, generally between 5% and 40% and preferably less than 30%.

Among these elastomers, mention may be made of natural rubber, polyisoprene with a high content of cis double bonds, a polymerized emulsion based on styrene/butadiene copolymer, a polybutadiene with a high content of cis double bonds obtained by nickel, cobalt, titanium or neodymium catalysis, a halogenated ethylene/propylene/diene terpolymer, a halogenated butyl rubber, a styrene/butadiene block copolymer, a styrene/isopropene block copolymer, halogenated products of the above polymers, an acrylonitrile/butadiene copolymer, an acrylic elastomer, a fluoroelastomer, chloroprene and epichlorohydrin rubbers.

If the structure of the invention does not include a tie layer, it is recommended that the elastomer be chosen from functionalized elastomers, elastomers with acrylate units, halogenated elastomers and epichlorohydrin rubbers. As regards functionalized elastomers, the function is advantageously a carboxylic acid or carboxylic acid anhydride function. When the elastomers mentioned above comprise no carboxylic acid radicals or anhydride radicals deriving from the said acids (which is the case for most of them), the said radicals will be provided by grafting the abovementioned elastomers in a known manner or by blends of elastomers, for example with elastomers containing acrylic units such as acrylic acid. The abovementioned vulcanizable elastomers preferably have a weight content of carboxylic acid or dicarboxylic acid anhydride radicals of between 0.3% and 10% relative to the said elastomers.

Similarly, it is possible to blend elastomers which have no acrylate units or functions, which are not halogenated and which are not epichlorohydrin rubbers, with at least one elastomer chosen from functionalized elastomers, elastomers containing acrylate units, halogenated elastomers and epichlorohydrin rubbers.

Among the elastomers mentioned above which may be selected are those included in the following group: carboxylated nitrile elastomers, acrylic elastomers, carboxylated polybutadienes, ethylene/propylene/diene terpolymers these being grafted, or blends of these polymers with the same elastomers but which are not grafted, such as nitrile rubbers, polybutadienes and ethylene/propylene/diene terpolymers, alone or as a blend.

The vulcanizing systems that are suitable for the present invention are well known to those skilled in the art and, consequently, the invention is not limited to one particular type of system.

The elastomeric compositions may be modified for certain particular properties (for example improvement in the mechanical properties) by adding fillers such as carbon black, silica, kaolin, alumina, clay, talc, chalk, etc. These fillers may be surface-treated with silanes, polyethylene glycols or any other coupling molecule. In general, the content of fillers in parts by weight is between 5 and 100 per 100 parts of elastomers.

In addition, the compositions may be flexibilized with plasticizers such as mineral oils derived from petroleum, phthalic acid esters or sebacic acid esters, liquid polymeric plasticizers such as low-mass polybutadiene optionally carboxylated, and other plasticizers that are well known to those skilled in the art.

The vulcanization agent combinations used are such that they must allow the elastomer to be completely crosslinked at a rate resulting in good properties as regards resistance to separation of the elastomer layer from other layers.

As regards the making of the structures of the invention and more particularly the pipes and hoses, the structure of the invention may also include a reinforcing layer of the textile type, for example made of polyester or of metal wires.

As used herein, pipes are long hollow cylinders through which a gas or liquid can flow. A hose is a flexible tube for carrying fluids or gasses under pressure. A tube if a cylindrical rigid hollow object capable of carrying fluid and gasses under pressure.

The pipes and hoses of the invention may have an outside diameter of between 8 mm and 25 cm. The thickness of the thermoplastic compound containing nanofillers may be between 25 and 500 μm.

These hoses can be manufactured by coextrusion—each layer is introduced in the melt using an extruder into a coextrusion head which produces concentric streams forming the tube. This technique is known per se. The tube is then passed through an oven or heating tunnel in order to carry out the vulcanization (crosslinking) of the elastomer. It is recommended during the coextrusion to use a coextrusion head in which the stream of elastomer remains at a sufficiently low temperature (in general about 80 to 120° C.) in order not to cause vulcanization before the tube has been formed and above all to prevent the extruder from becoming blocked. It is also possible to manufacture by coextrusion a hose which does not include the first elastomer layer, and then to make this hose pass through a device called a "jacketing" device or "crosshead" in order to cover it with the elastomer layer. All that is then required, as above, is to pass the hose through an oven or heating tunnel in order to vulcanize (crosslink) the elastomer. If the hose includes an inner layer of vulcanized elastomer, the process then starts with the manufacture of a hose consisting of just this layer, which is then vulcanized and put back through a device called a "jacketing" or "crosshead" device in order to cover it with all the other layers, apart from the outer elastomer layer, the process then continuing as above.

What is claimed is:

1. A multi-layer pipe or hose comprising:
    a) at least one layer of a thermoplastic compound containing lamellar peelable nanofillers; and
    b) at least one outer layer of rubber,
wherein said pipe or hose has an outside diameter of from 8 mm to 25 cm, and wherein the thickness of the thermoplastic layer containing nanofillers is from 25 micrometers to 500 micrometers, and wherein the inner layer of said pipe or hose is directly in contact with a cryogenic fluid.

2. The multi-layer pipe or hose of claim 1, wherein said thermoplastic compound is selected from the group consisting of polyamides, thermoplastic urethane (TPU), fluoropolymers, terpolymer of tetrafluoroethylene, hexafluoropropylene and vinylidene fluoride (THV), perfluoroalkoxy (PFA), polyimides, polypropylene sulphide (PPS), and poly propylene oxide (PPO).

3. The multi-layer pipe or hose of claim 2, wherein said thermoplastic compound is a polyamide or a mixture of polyamides.

4. The multi-layer pipe or hose of claim 1, wherein said nanofillers are present at from 0.1 to 50 parts by weight per 100 parts by weight of said thermoplastic.

5. The multi-layer pipe or hose of claim 4, wherein said nanofillers are present at from 2 to 15 parts by weight per 100 parts by weight of said thermoplastic.

6. The multi-layer pipe or hose of claim 1, wherein said rubber is selected from the group consisting of natural rubber, polyisoprene with a high content of cis double bonds, a polymerized emulsion based on styrene/butadiene copolymer, a polybutadiene with a high content of cis double bonds obtained by nickel, cobalt, titanium or neodymium catalysis, a halogenated ethylene/propylene/diene terpolymer, a halogenated butyl rubber, a styrene/butadiene block copolymer, a styrene/isopropene block copolymer, halogenated products of the above polymers, an acrylonitrile/butadiene copolymer, an acrylic elastomer, a fluoroelastomer, chloroprene and epichlorohydrin rubbers.

7. The multi-layer pipe or hose according to claim 1 comprising a rubber outer layer, a thermoplastic compound containing nanofillers as an intermediate layer and a rubber inner layer.

8. The multi-layer pipe or hose according to claim 1 comprising a rubber outer layer and a thermoplastic compound containing nanofillers as the inner layer.

* * * * *